(12) United States Patent
Johansson

(10) Patent No.: US 11,104,026 B2
(45) Date of Patent: Aug. 31, 2021

(54) CHAIN AND BAR CASSETTE AND CHAINSAW GUIDE BAR WITH TENSION INDICATOR

(71) Applicant: HUSQVARNA AB, Huskvarna (SE)

(72) Inventor: Jörgen Johansson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 140 days.

(21) Appl. No.: 15/555,133

(22) PCT Filed: Mar. 1, 2016

(86) PCT No.: PCT/IB2016/051126
§ 371 (c)(1),
(2) Date: Sep. 1, 2017

(87) PCT Pub. No.: WO2016/139577
PCT Pub. Date: Sep. 9, 2016

(65) Prior Publication Data
US 2018/0043567 A1    Feb. 15, 2018

Related U.S. Application Data

(60) Provisional application No. 62/127,897, filed on Mar. 4, 2015, provisional application No. 62/128,238, filed on Mar. 4, 2015.

(51) Int. Cl.
*B27B 17/14* (2006.01)
*B27B 17/02* (2006.01)
(Continued)

(52) U.S. Cl.
CPC ............ *B27B 17/14* (2013.01); *B23D 59/001* (2013.01); *B27B 17/0008* (2013.01); *B27B 17/025* (2013.01); *B27B 17/12* (2013.01)

(58) Field of Classification Search
CPC ... B27B 17/14; B27B 17/025; B27B 17/0008; B27B 17/12; B23D 59/001
See application file for complete search history.

(56) References Cited

U.S. PATENT DOCUMENTS 5,528,835 A * 6/1996 Ra ........................... B27B 17/14
30/383
5,896,670 A * 4/1999 Gibson ................... B27B 17/14
30/386
(Continued)

FOREIGN PATENT DOCUMENTS

EP    0955139 A2   11/1999
EP    2036687 A2   3/2009

OTHER PUBLICATIONS

International Search Report and Written Opinion for International Application No. PCT/IB2016/051126 dated Jul. 11, 2016.

*Primary Examiner* — Ghassem Alie
*Assistant Examiner* — Fernando A Ayala
(74) *Attorney, Agent, or Firm* — Burr & Forman, LLP

(57) ABSTRACT

A chainsaw (100) includes a power unit and a working assembly powered responsive to operation of the power unit. The working assembly includes a guide bar (120) around which a chain (210) is rotatable. The guide bar (120) includes first and second side plates (400, 410), a core (420) and a tension indicator (240). The first and second side plates (400, 410) each face other and extend away from a housing (110) to a nose. The core (420) is disposed between the first side plate (400) and the second side plate (410). The tension indicator (240) is provided at the core (420) and is visible at at least one of the first side plate 10 (400) or the second side plate (410). The tension indicator (240) is configured to indicate a chain tension based on a position of the guide bar (120).

20 Claims, 8 Drawing Sheets

(51) Int. Cl.
*B23D 59/00* (2006.01)
*B27B 17/00* (2006.01)
*B27B 17/12* (2006.01)

(56) References Cited

U.S. PATENT DOCUMENTS

| | | | | |
|---|---|---|---|---|
| 6,049,986 | A * | 4/2000 | Calkins | B27B 17/025 |
| | | | | 30/383 |
| 6,061,915 | A * | 5/2000 | Seigneur | B27B 17/025 |
| | | | | 30/383 |
| 6,237,229 | B1 * | 5/2001 | Igawa | B27B 17/025 |
| | | | | 30/383 |
| 6,944,958 | B1 * | 9/2005 | King | B27B 17/025 |
| | | | | 188/65.1 |
| 7,640,669 | B1 * | 1/2010 | King | B27B 17/10 |
| | | | | 30/383 |
| 8,434,236 | B2 * | 5/2013 | Pellenc | B27B 17/14 |
| | | | | 30/381 |
| 2012/0204655 | A1 * | 8/2012 | Gregar | G01L 5/102 |
| | | | | 73/862.42 |
| 2014/0106915 | A1 * | 4/2014 | Kistler | B27B 17/14 |
| | | | | 474/111 |
| 2014/0124336 | A1 * | 5/2014 | Domenicucci | B65G 43/02 |
| | | | | 198/810.02 |
| 2016/0116356 | A1 * | 4/2016 | Goldstein | B62J 99/00 |
| | | | | 73/1.15 |

\* cited by examiner

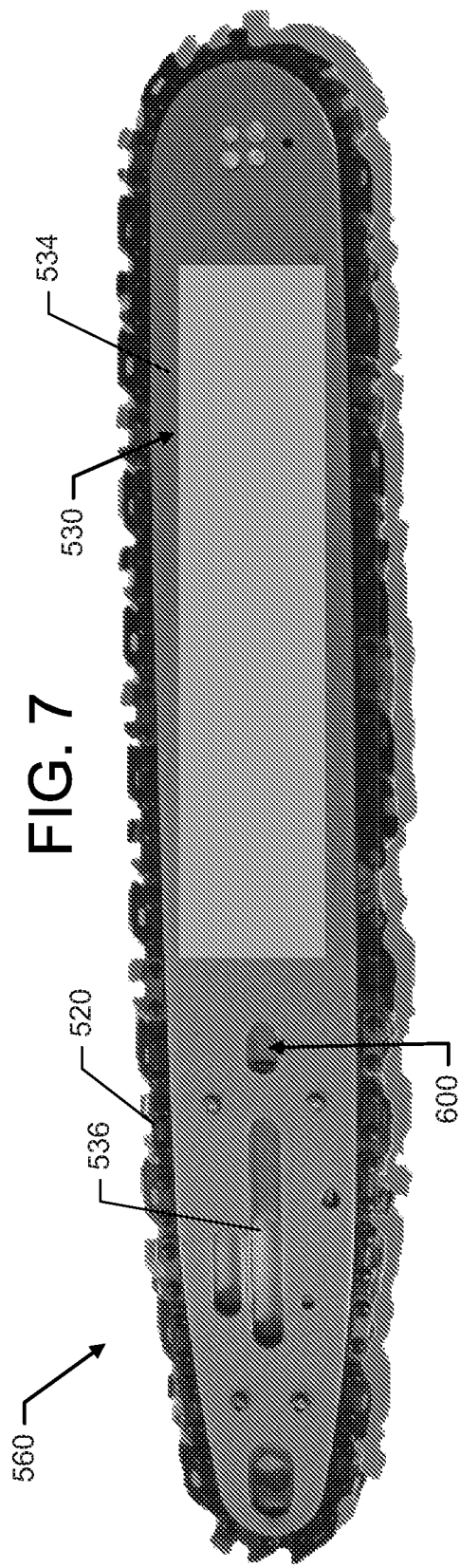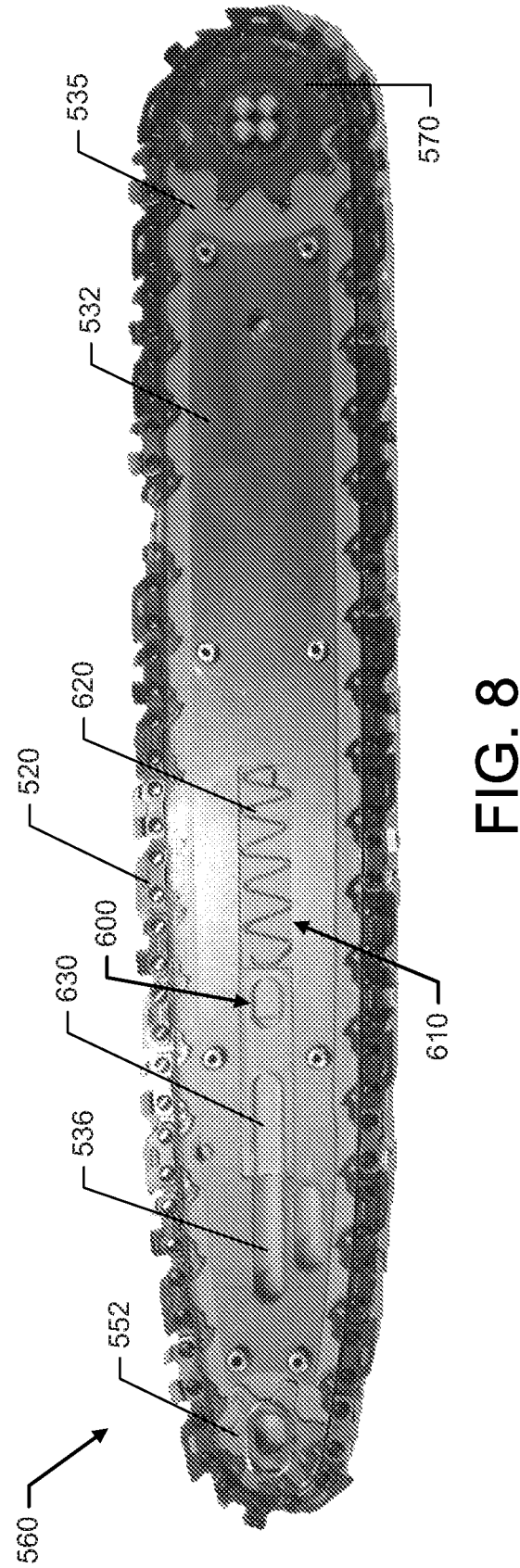

CHAIN AND BAR CASSETTE AND CHAINSAW GUIDE BAR WITH TENSION INDICATOR

CROSS REFERENCE TO RELATED APPLICATIONS

This application claims priority to U.S. provisional application Nos. 62/128,238 and 62/127,897, both filed on Mar. 4, 2015, the entire contents of which are incorporated herein by reference.

TECHNICAL FIELD

Example embodiments generally relate to hand held power equipment and, more particularly, relate to a guide bar improvements for a chainsaw.

BACKGROUND

Chainsaws are commonly used in both commercial and private settings to cut timber or perform other rigorous cutting operations. Because chainsaws are typically employed in outdoor environments, and the work they are employed to perform often inherently generates debris, chainsaws are typically relatively robust hand held machines. They can be powered by gasoline engines or electric motors (e.g., via batteries or wired connections) to turn a chain around a guide bar at relatively high speeds. The chain includes cutting teeth that engage lumber or another medium in order to cut the medium as the teeth are passed over a surface of the medium at high speed.

Given that the chainsaw may be employed to cut media of various sizes, the length of the guide bar can be different for different applications. However, in most situations, the guide bar is relatively long, and may actually be substantially longer than the main body of the chainsaw. The guide bar is typically made of steel, and thus, the guide bar can be a substantial contributor to the overall weight of the chainsaw.

Reducing the weight of the chainsaw can allow it to be more easily controlled and carried for long periods of time. However, weight is not the only concern or point of possible improvement in relation to guide bar design. As such, it may be desirable to explore a number of different guide bar design improvements that could be employed alone or together to improve overall chainsaw performance.

BRIEF SUMMARY OF SOME EXAMPLES

Some example embodiments may provide for a guide bar constructed with laminate cores that can be glued, welded or otherwise fixed together to incorporate various improvements. In some cases, the core laminate construction may allow a chain tension indicator to be incorporated into the guide bar to enable the user to achieve the proper chain tension more easily. Other improvements may also be possible, and the improvements can be made completely independent of each other, or in combination with each other in any desirable configuration. Accordingly, the operability and utility of the chainsaw may be enhanced or otherwise facilitated.

In an example embodiment, a chainsaw that includes a power unit and a working assembly powered responsive to operation of the power unit is provided. The working assembly includes a guide bar around which a chain is rotatable. The guide bar includes first and second side plates, a core and a tension indicator. The first and second side plates each face other and extend away from a housing to a nose. The core is disposed between the first side plate and the second side plate. The tension indicator is provided at the core and is visible at at least one of the first side plate or the second side plate. The tension indicator is configured to indicate a chain tension based on a position of the guide bar.

Some example embodiments may also provide a bar and chain cassette as a single assembly. The bar and chain cassette may be provided such that the chain is already provided properly installed on the bar and the drive sprocket. The bar, with chain provided thereon already mated with the drive sprocket, may then be installed onto the chainsaw without any possibility for the operator to incorrectly install the chain. Thus, assembly of the chainsaw by a buyer or user of the chainsaw may be made simpler and easier.

In another example embodiment, a method of providing a chainsaw bar assembly is provided. The method includes providing a first plate and second plate of a guide bar where the first and second plates extend from a nose portion to a heel portion, providing a drive sprocket at a heel portion of the first plate, providing a chain to extend around a periphery of the first plate in engagement with the drive sprocket, and operably coupling the second plate to the first plate to enclose the drive sprocket between heel portions of the first and second plates.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 7 illustrates a side view of the bar and chain cassette in accordance with an example embodiment;

FIG. 8 illustrates a side view of the bar and chain cassette with one side plate removed in accordance with an example embodiment.

DETAILED DESCRIPTION

Figure 1:
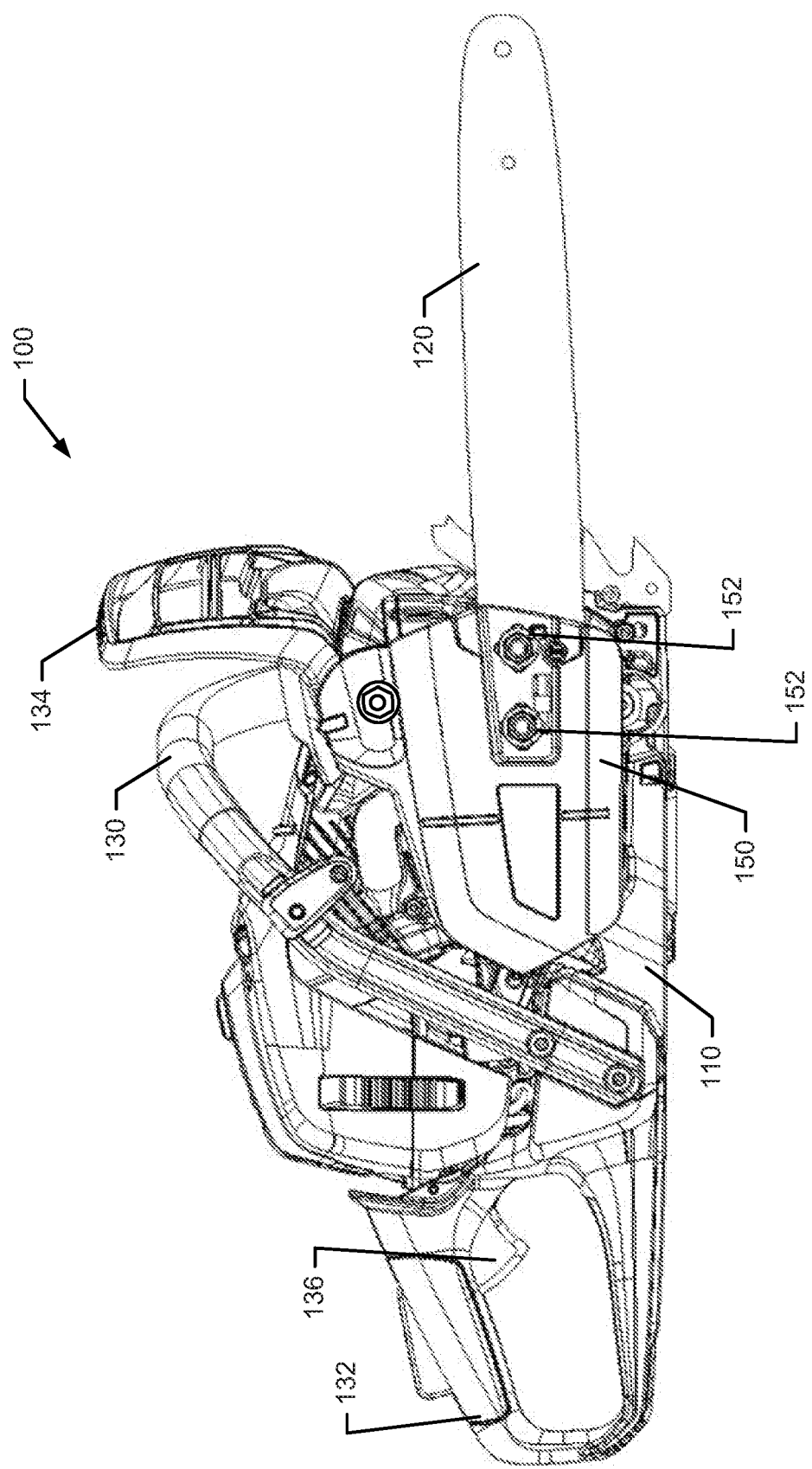
FIG. 1 illustrates a side view of a chainsaw according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

FIG. 1 illustrates side view of a chainsaw 100 according to an example embodiment. As shown in FIG. 1, the chainsaw 100 may include a housing 110 inside which a power unit or motor (not shown) is housed. In some embodiments, the power unit may be either an electric motor or an internal combustion engine. Furthermore, in some embodiments, the power unit may include more than one electric motor where one such electric motor powers the working assembly of the chainsaw 100 and the other electric motor of the power unit powers a pump that lubricates the working assembly or provides momentum for moving other working fluids within the chainsaw 100. The chainsaw 100 may further include a guide bar 120 that is attached to the housing 110 along one side thereof. A chain (not shown in FIG. 1) may be driven around the guide bar 120 responsive to operation of the power unit in order to enable the chainsaw 100 to cut lumber or other materials. The guide bar 120 and the chain may form the working assembly of the chainsaw 100. As such, the power unit may be operably coupled to the working assembly to turn the chain around the guide bar 120.

The chainsaw 100 may include a front handle 130 and a rear handle 132. A chain brake and front hand guard 134 may be positioned forward of the front handle 130 to stop the movement of the chain 122 in the event of a kickback. In an example embodiment, the hand guard 134 may be tripped by rotating forward in response to contact with a portion of the arm (e.g., the hand/wrist) of the operator of the chainsaw 100. In some cases, the hand guard 134 may also be tripped in response to detection of inertial measurements indicative of a kickback.

The rear handle 132 may include a trigger 136 to facilitate operation of the power unit when the trigger 136 is actuated. In this regard, for example, when the trigger 136 is actuated (e.g., depressed), the rotating forces generated by the power unit may be coupled to the chain either directly (e.g., for electric motors) or indirectly (e.g., for gasoline engines). The term "trigger," as used herein, should be understood to represent any actuator that is capable of being operated by a hand or finger of the user. Thus, the trigger 136 may represent a button, switch, or other such component that can be actuated by a hand or portion thereof.

Some power units may employ a clutch to provide operable coupling of the power unit to a sprocket that turns the chain. In some cases (e.g., for a gasoline engine), if the trigger 136 is released, the engine may idle and application of power from the power unit to turn the chain may be stopped. In other cases (e.g., for electric motors), releasing the trigger 136 may secure operation of the power unit. The housing 110 may include a fuel tank for providing fuel to the power unit. The housing 110 may also include or at least partially define an oil reservoir, access to which may be provided to allow the operator to pour oil into the oil reservoir. The oil in the oil reservoir may be used to lubricate the chain as the chain is turned.

As can be appreciated from the description above, actuation of the trigger 136 may initiate movement of the chain around the guide bar 120. A clutch cover 150 may be provided to secure the guide bar 120 to the housing 110 and cover over the clutch and corresponding components that couple the power unit to the chain (e.g., the sprocket and clutch drum). As shown in FIG. 1, the clutch cover 150 may be attached to the body of the chainsaw 100 (e.g., the housing 110) via nuts 152 that may be attached to studs that pass through a portion of the guide bar 120. The guide bar 120 may also be secured with the tightening of the nuts 152, and a tightness of the chain can be adjusted based on movement of the guide bar 120 and subsequent tightening of the nuts 152 when the desired chain tightness is achieved. Thus, for example, the guide bar 120 may be placed on the chainsaw 100 and the clutch cover 150 may be put in place. Nuts 152 may be screwed in place, but not fully tightened. Chain tension may then be adjusted to the appropriate tightness level (e.g., while referencing the tension indicator 240 as discussed below), and then the nuts 152 may be fully tightened to fixate the guide bar 120. However, other mechanisms for attachment of the clutch cover 150 and/or the guide bar 120 may be provided in other embodiments including, for example, some tightening mechanisms that may combine to tighten the chain in connection with clamping the guide bar 120.

Effective operation (and performance) of the chainsaw 100 is, at least in part, dependent upon having proper chain tension. If the chain is too tight, the chainsaw 100 will be robbed of its power due to increased friction. If the chain is too loose, the chain may come off the bar and disrupt operation or become a safety concern. Although some models may include automatic tensioning features, it remains common for operators to manually adjust chain tension by adjusting the position of the guide bar 120. In this regard, some models may include a chain tension screw that can be rotated to move the guide bar 120 in a direction to increase tension (e.g., by moving the guide bar 120 in a direction generally away from a front of the housing 110) or decrease tension (e.g., by moving the guide bar 120 in a direction generally closer to the front of the housing 110). Moreover, in some cases, the guide bar 120 itself may be manually repositioned to adjust tension. In either case, an operator that is not experienced may not know what tension to select. Accordingly, some example embodiments may provide a tension indicator that the operator can reference to ensure that the proper tension is set. In some embodiments, the tension indicator may be provided directly on the guide bar 120.

Figure 2:
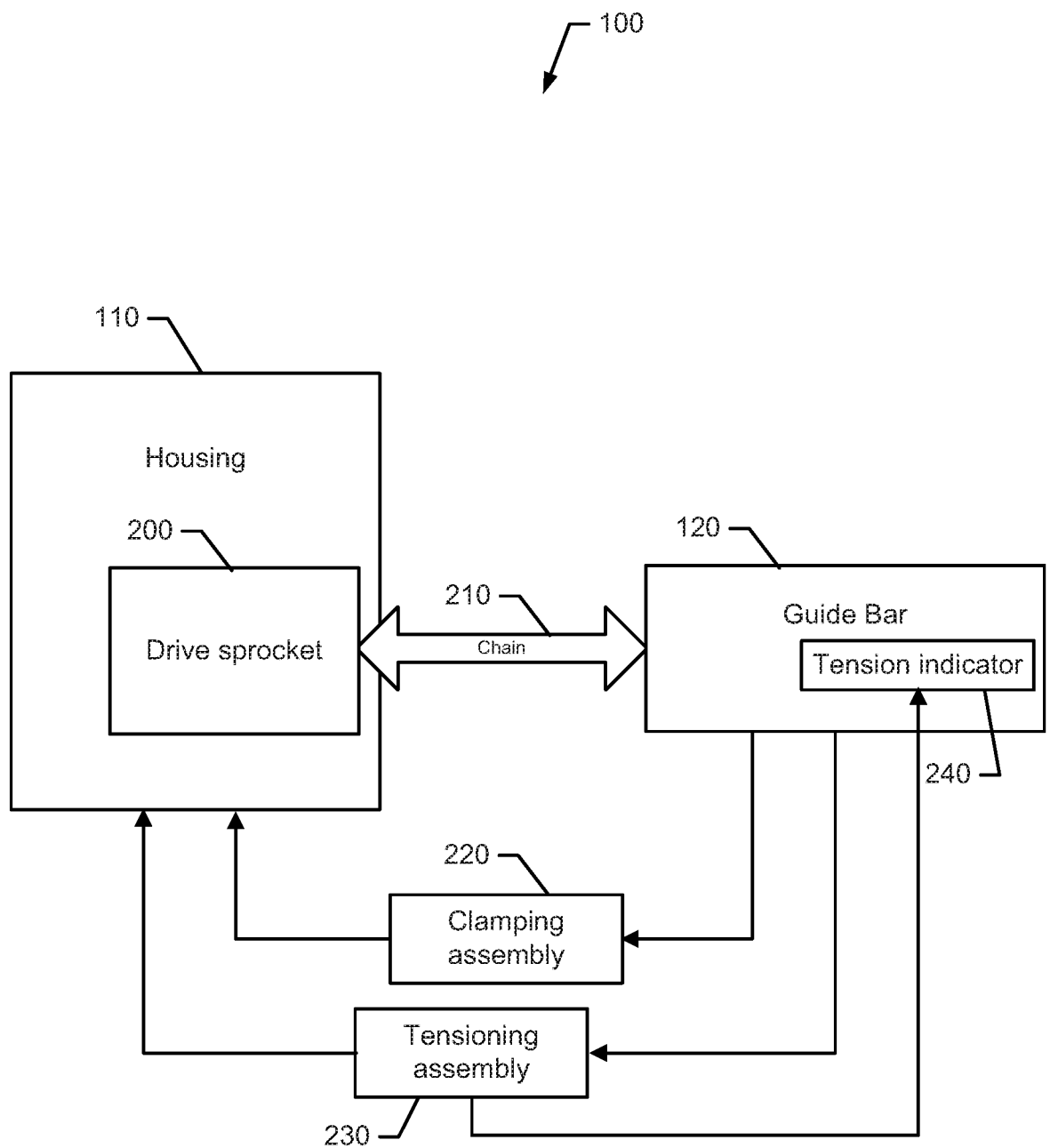
FIG. 2 illustrates a block diagram of various units of the chainsaw according to an example embodiment.

FIG. 2 illustrates a block diagram of various units of the chainsaw 100 according to an example embodiment. In this regard, the housing 110 of the chainsaw 100 may house the power unit, as mentioned above. The power unit may be operably coupled to a drive sprocket 200 that turns a chain 210 around the guide bar 120. The guide bar 120 may be affixed to the housing 110 via a clamping assembly 220 (of which the nuts 152 may be an example). Meanwhile, the tension of the chain 210 may be adjusted via a tensioning assembly 230. The tensioning assembly 230 can be provided in different ways such as, for example, by providing a tension adjustment screw in the manner described above. Additionally or alternatively, the tensioning assembly 230 may include a set of posts that may be affixed to the housing 110 to engage a portion of the guide bar 120 that may include a tension indicator plate (not shown in FIG. 2) that interfaces with a tension indicator 240 disposed at a portion of the guide bar 240.

Figure 3:
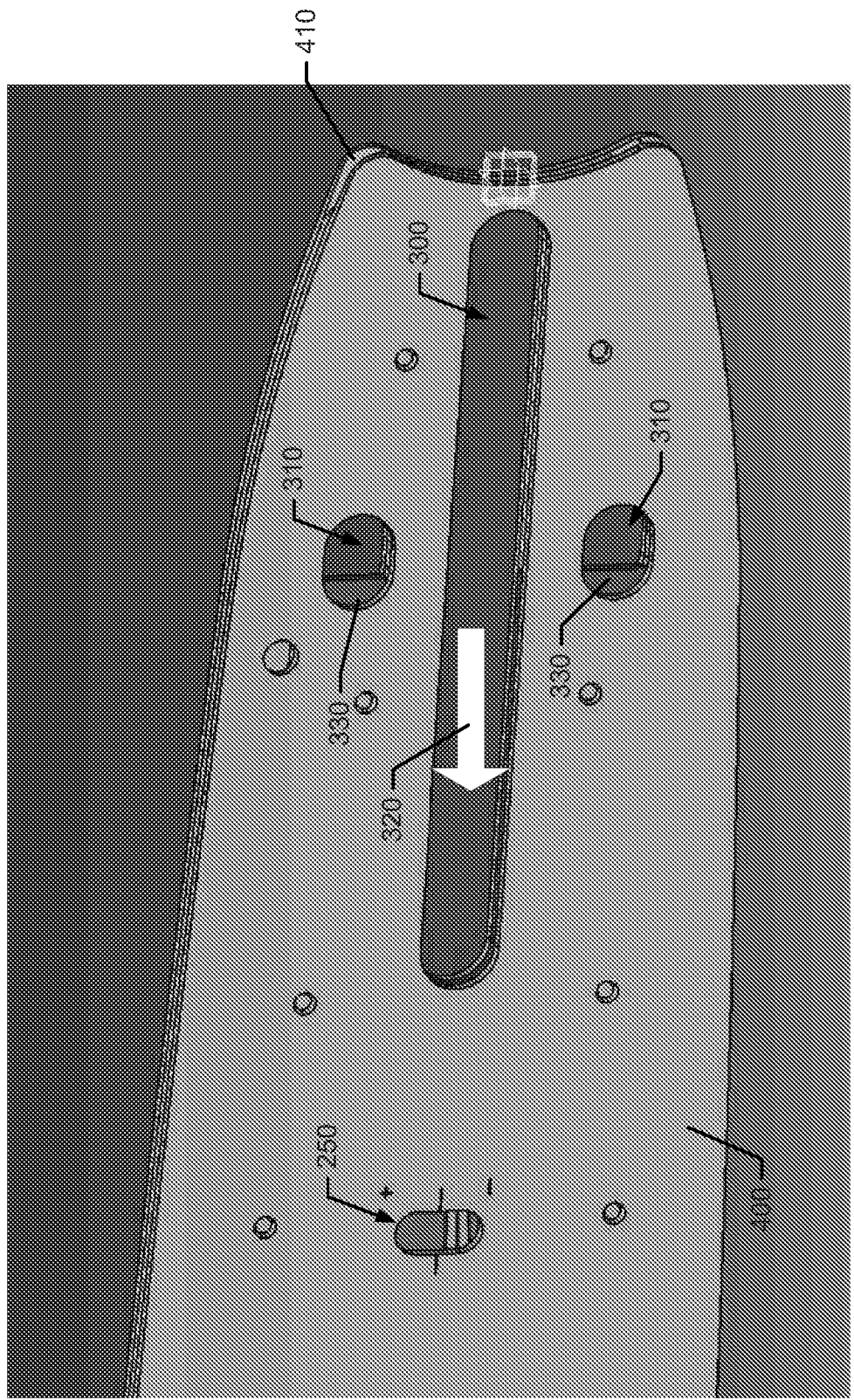
FIG. 3 illustrates a perspective side view of a tension indicator on a guide bar in accordance with an example embodiment.

The tension indicator 240 can be embodied in different ways. However, in some example embodiments, the tension indicator 240 can be embodied as a gauge 250 provided at a portion of the guide bar 120, as shown in FIG. 3. As can be appreciated from FIG. 3, the guide bar 120 may include a slot 300 that extends along a longitudinal centerline of the guide bar 120. The slot 300 may extend away from a portion of the guide closest to the drive sprocket (e.g., the heel portion of the guide bar 120) toward a center of the guide bar 120 over the range of a few inches. In some cases, attachment holes 310 may be provided on opposing sides of the slot 300, spaced apart from the slot 300. The attachment holes 310 may receive the posts extending from the housing 110 as described above. The posts (e.g., tensioning pins) may be fixed so that any movement of the guide bar 120 in the direction of arrow 320 (e.g., the tightening direction) would increase tension on the chain 210. In order to enable such movement to be reflected or otherwise indicated at the gauge 250, a tension plate 330 may be provided inside the guide bar 120. The tension plate 330 may be operably coupled to the gauge 250 to indicate the tension on the chain 210 based on the tension being applied to the tension plate 330 via contact with the posts.

To provide the tension plate 330, the guide bar 120 may be provided as two parallel side plates. As such, it can be appreciated that the guide bar 120 may be formed from two laminate core sheets that lie in parallel planes along side each other. These laminate core sheets may be made from stainless steel or other sufficiently rigid and durable materials. The laminate core sheets may be referred to herein as a first side plate 400 and a second side plate 410, respectively. The first and second side plates 400 and 410 may generally be spaced apart from each other be at least a certain distance, which may be substantially consistent over the lengths of the first and second side plates 400 and 410. Moreover, in some cases, void spaces may be formed by etching or machining of the inner surfaces of the first and second side plates 400 and 410. However, in some cases, a core 420 (see FIG. 4) may be provided between the first and second side plates 400 and 420, and the tension plate 330 may be provided in a void space formed in the core 420. In any case, the tension plate 330 may be provide in a void space between the first and second side plates 400 and 410 to facilitate proper functioning of the gauge 250 to indicate chain tension. The gauge 250 may be visible at a cutout portion, where a hole or orifice is cut in at least one of the side plates (e.g., the first side plate 400).

Figure 4:
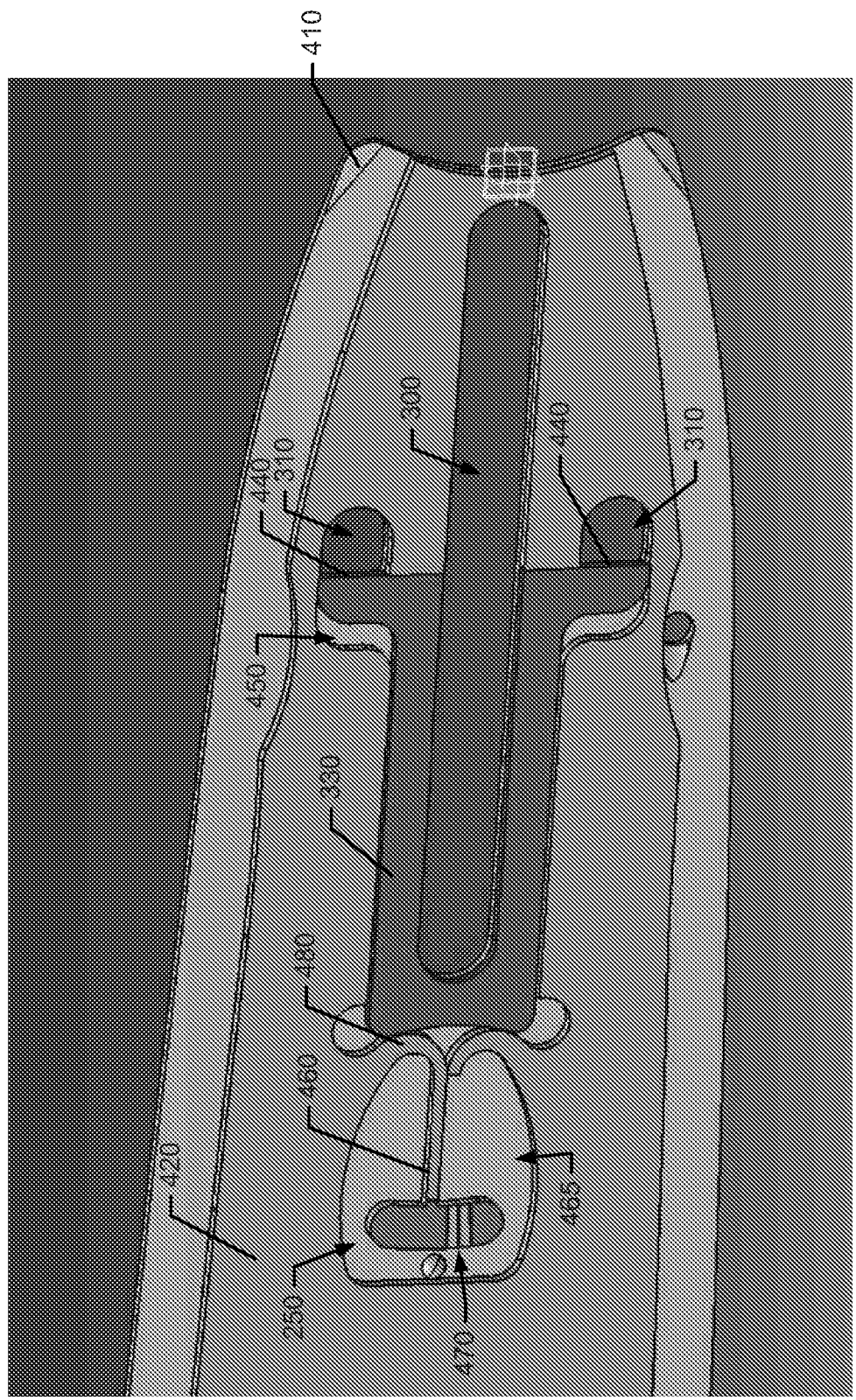
FIG. 4 illustrates a cutaway view of the guide bar of FIG. 3 with one side plate removed in accordance with an example embodiment.

FIG. 4 shows the first side plate 400 removes to provide a view of the inside of the guide bar 120 to facilitate an explanation of the structure and operation of the gauge 250 in accordance with one example embodiment. Referring now to FIGS. 3 and 4, the tension plate 330 may include a U-shaped portion that extends around at least a portion of the slot 300 (e.g., around a forward portion of the slot 300). Although not required, the tension plate 330 may extend around more than half of the slot 300 in some cases. Ends of the U-shaped portion of the tension plate 330 may extend outward (e.g., away from the slot 300) and toward a forward portion of the attachment holes 310 to form contact points 440. The contact points 440 may extend at least partially into the attachment holes 310 so that the posts can impart a force on the contact points 440 to urge the tension plate 330 in the direction of arrow 320 when chain tension is increased. The void space 450 in the core 420 is provided with sufficient space forward of the attachment holes 310 to allow the tension plate 330 to move in the direction of arrow 320.

Responsive to movement of the tension plate 330 in the direction of arrow 320, the tension plate 330 may exert a force on a portion of the core (or a separate component) that is formed in such a manner that allows the portion to function as an indicator needle 460 relative to the gauge 250. The gauge 250 may have ranges defined thereon (e.g., with colors, values or other indicator means) to allow the operator to adjust tension on the tension plate 330 (e.g., by moving the tension plate 330 in the direction of arrow 320 to increase tension and watch the indicator needle 460 be deflected downward (in this example) as tension increases until the indicator needle 460 points to the desirable range 470 indicated on the gauge 250. In an example embodiment, the gauge 250 may indicate a red field with the desirable range 470 being shown as a green range in the otherwise red field. However, other indication schemes could alternatively be employed.

In this example, the indicator needle 460 is formed by bending a portion of the core 420 material toward the void space 450 and then back away from the void space 450 and toward the gauge 250. At the bend apex 480, the tension plate 330 contacts the indicator needle 460 to deflect the indicator needle 460 within a gauge void space 465. Deflection of the indicator needle 460 may be visible relative to the ranges indicated on the gauge 250. As such, the indicator needle 460 may be provided with one end fixed to a portion of the core 420 and the other end suspended at a location determined at least in part by a position of the tension plate 330.

The tension plate 330 and the indicator needle 460 may be constructed, and the gauge 250 scales correspondingly adjusted so that, when the operator applies tension to the chain, the gauge 250 is calibrated to show the indicator needle 460 in the desirable range 470 when a desirable chain tension is achieved. The operator can therefore make adjustments to chain tension and view the impact of those adjustments on the indicator needle 460 in real time, and stop the adjustments when the indicator needle 460 is in the desirable range 470. Example embodiments may therefore improve the ability of operators to achieve and maintain proper chain tension. As such, chainsaw 100 efficiency and utility may be increased and operator satisfaction may also be enhanced.

As indicated above, assembly of a chainsaw involving the attachment of the chain and bar to the main body of the chainsaw and the drive sprocket can be complicated for inexperienced operators. The chain itself must be inserted into the groove that extends around the periphery of the bar and must then be attached to the drive member or drive sprocket (e.g., clutch) of the chainsaw while the bar is also attached to the main body of the chainsaw. This assembly process first requires that the chain be oriented properly onto the bar. Then, the chain must be tightly held (typically by one hand of the operator) to the bar while exposing slack in the chain at the end of the bar that engages the main body of the chainsaw. The bar must then be held in a proper orientation while the slack portion in the chain is provided over the drive sprocket (e.g., clutch) of the chainsaw and the bar is installed onto the main body of the chainsaw. Some operators may struggle to maintain the proper alignments and orientations while attempting this assembly.

Some example embodiments may provide a chain and bar as a prepackaged or preassembled unit that already integrates the drive sprocket and is ready for relatively easy installation onto the main body of the chainsaw. Accordingly, the customer need only choose the length of bar the customer desires. All other components are already part of the chain and bar cassette so there is also no chain slack adjustment.

Figure 5:
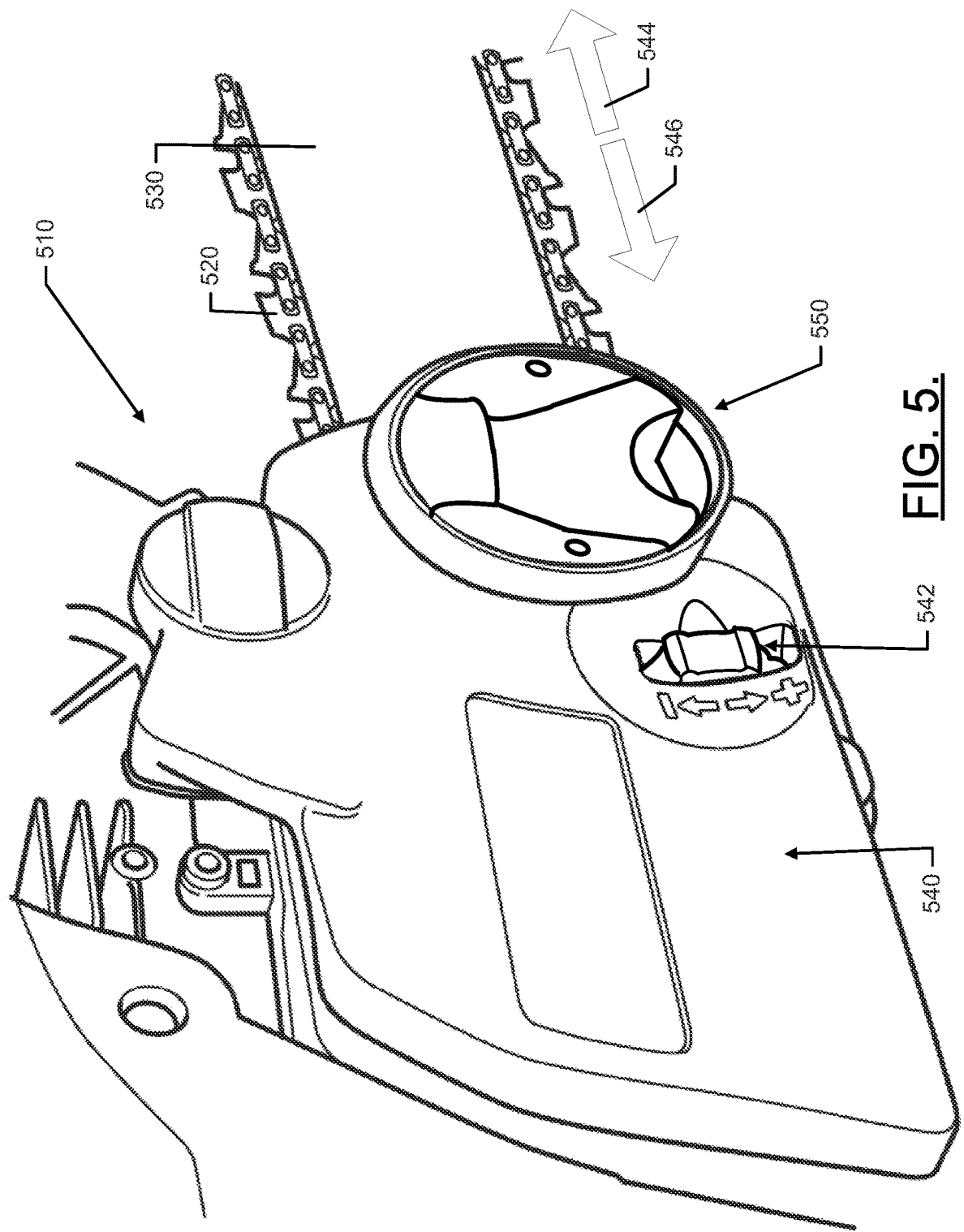
FIG. 5 illustrates a side view of a chainsaw according to an example embodiment.
Figure 6:
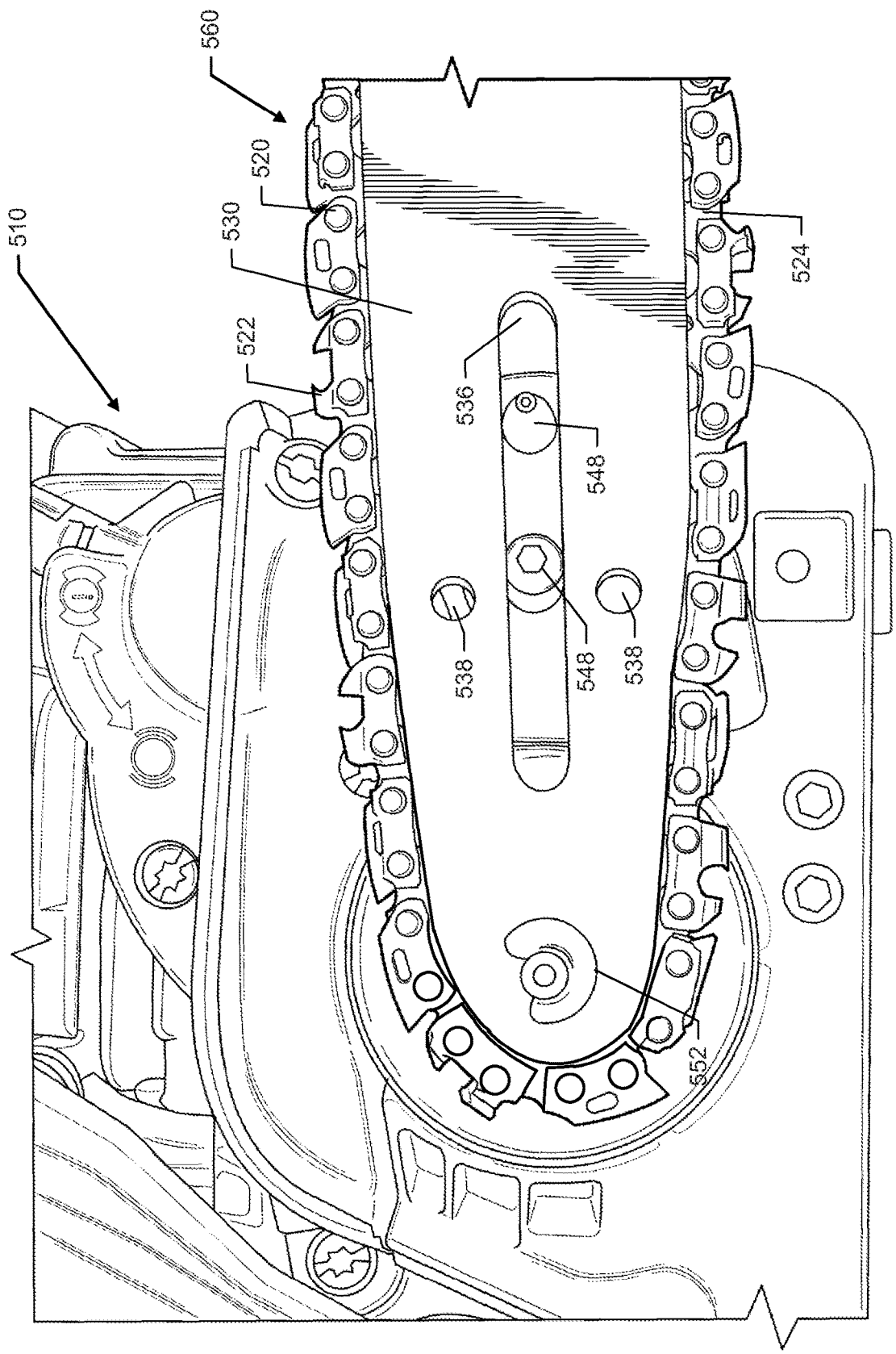
FIG. 6 illustrates a side view of the chainsaw with drive sprocket cover removed to show attachment of a bar and chain cassette in accordance with an example embodiment.

An example embodiment will now be described in connection with the drawings shown in FIGS. 5-8. FIG. 5 illustrates the assembled chainsaw, and FIG. 6 illustrates the clutch cover of chainsaw removed for attachment of the bar and chain cassette of an example embodiment. FIG. 7 illustrates a side view of the bar and chain cassette of an example embodiment, and FIG. 8 illustrates the bar and chain cassette with one side plate removed to expose the core and components inside the bar and chain cassette.

Referring now to FIGS. 5-8, a chainsaw 510 is shown fully assembled in order to facilitate a description of some portions of the chainsaw 510 that are applicable to interaction with an example embodiment. However, it should be appreciated that example embodiments may be practiced with respect to a bar and chain cassette 560 (see FIGS. 6-8) and thus, installation of the bar and chain cassette 560 onto the chainsaw 510 is not required in order to practice an example embodiment. Instead, example embodiments relate to the production of an assembly (i.e., the bar and chain cassette 560 itself) that may be produced prior to installation of the bar and chain cassette 560 onto the chainsaw 510. Moreover, the practicing of an example embodiment may be accomplished in a manner that facilitates easy installation of the bar and chain cassette 560 to achieve the full assembly of chainsaw 510 as shown in FIG. 5.

Among other things, the chainsaw 510 may include a drive member or drive sprocket 552 (see FIG. 8) that is rotated responsive to operation of the engine of the chainsaw 510. The drive sprocket 552 may be operably connected to a saw chain 520, which may include cutters 522 disposed on all or some of a series of chain links 524 that are interconnected to form a continuous flexible chain. Some of the chain links 524 may include engagement teeth that are configured to fit within and slidably engage a guide slot that extends around a periphery of a bar 530 (e.g., a chain bar or guide bar) that is operably coupled to the chainsaw 510.

In some embodiments, the drive sprocket 552 or drive member may be embodied as a part of a clutch that is disengaged when the engine idles, but engages to rotate the chain 520 around the bar 530 (e.g., via the engagement teeth sliding through the guide slot) when the engine throttle is opened. In chainsaws that are electrically powered, there may be no need for a clutch, since an electric motor may power the drive sprocket and the electric motor need not idle when rotation of the chain is not desired. Thus, instead of including a clutch, the electric motor may be engaged to drive the drive sprocket whenever a trigger or throttle lever is depressed to activate the electric motor and may simply be disengaged at other times.

The bar 530 may be a substantially flat metallic member that is elongated to form a substantially oblong blade. In some embodiments, the bar 530 may be formed from two flat side plates with a core 532 disposed therebetween. FIG. 7 illustrates a side view of the bar and chain cassette 560 and therefore a first plate 534 of the two flat side plates is shown. However, FIG. 8 shows the first plate 534 removed so that the core 532 and the second side plate 535 are visible. In any case, the bar 530 may include at least two general portions, namely an exposed portion and a chainsaw body engagement portion. The exposed portion may include the portion of the bar 530 that exposes cutters 522 for use in cutting lumber. Meanwhile, the chainsaw body engagement portion may be the portion of the bar 530 that is hidden by a drive sprocket cover or a clutch cover 540 (see FIG. 5) of the chainsaw 510 when the bar 530 and chain 520 are operably coupled to a main body portion of the chainsaw 510. In some embodiments, the chainsaw body engagement portion may further include a slot 536 disposed to extent substantially along a longitudinal centerline of the chainsaw body engagement portion. The slot 536 may provide a variable engagement position between the main body portion of the chainsaw 510 and the bar 530. In this regard, one or more tensioner engagement orifices 538 may be disposed proximate to the slot 536 so that one or more pins may engage the tensioner engagement orifices 538 to enable the position of the bar 530 to be changed to adjust the tension of the chain 520.

The drive sprocket 552 may be hidden from view on the chainsaw 510 by the drive sprocket cover 540 (or clutch cover in embodiments where the drive sprocket is embodied as a clutch). The drive sprocket cover 540 may cover over the chainsaw body engagement portion of the bar 530. In other words, the drive sprocket cover 540 may cover over all portions of the bar 530 other than the exposed portion. In an example embodiment, the exposed portion may be considered to be the portion of the bar 530 that is forward of the drive sprocket cover 540 or not covered by the drive sprocket cover 540 when the bar 530 is installed on the chainsaw 510 and the drive sprocket cover 540 is also installed.

In some embodiments, the drive sprocket cover 540 may include a chain tensioner 542 disposed thereon to enable the bar to be shifted forward (as shown by arrow 544) or backward (as shown by arrow 546) to adjust the tension of the chain 520 on the bar 530. The bar 530 may be disposed proximate to a main body portion of the chainsaw 510 such that the chainsaw body engagement portion is proximate to the chainsaw 510 while the exposed portion extends away from the chainsaw 510. The main body portion of the chainsaw 510 may include one or more guide posts 548 extending therefrom parallel to each other. The guide posts 548 may be aligned to enable the slot 536 to be fitted over the guide posts 548 as shown in FIG. 6. One or more pins that are operably coupled to the chain tensioner 542 may then engage one or more of the tensioner engagement orifices 538 when the drive sprocket cover 540 is installed as shown in FIG. 5. Movement of the chain tensioner 542 in one direction may cause the one or more pins to move forward or rearward to shift the bar 530 forward or backward as shown by arrows 544 and 546, respectively. Movement of the chain tensioner 542 in the other direction, may cause movement of the bar 530 in the opposite direction. The drive sprocket cover 540 may also include a cover removal knob 550 that may be tightened to affix the drive sprocket cover 540 to the main body portion of the chainsaw 510, or may be loosened to enable the drive sprocket cover 540 to be removed (e.g., to expose the view provided in FIG. 6). In some cases, the cover removal knob 550 may be replaced by screws.

FIG. 6 shows a side view of the chainsaw 510 with the drive sprocket cover 540 removed. FIG. 6 further shows that, in accordance with an example embodiment, the drive member or drive sprocket 552 is integrated between the first and second plates 534 and 535 so that the sprocket teeth (not shown in FIG. 6, but visible in FIG. 8) are already in proper engagement with the chain 520 before and after the bar 530 is attached to the guide posts 548.

As indicated above, when the chain 520 and the bar 530 are not already assembled, some operators may struggle to achieve the arrangement shown in FIG. 6. In this regard, installation of the chain 520 and bar 530 may typically require that the operator hold the chain 520 to the bar 530 tightly so that the engagement teeth are substantially engaged with the guide slot leaving a portion of slack chain at a rear portion of the bar 530 (e.g., at an end of the chainsaw body engagement portion). The slack chain may then need to be routed around the clutch while the guide posts 548 are fed through the slot 536. However, some operators may struggle to achieve these alignments simultaneously. In this regard, while trying to achieve the routing of the slack in the chain 520 around the clutch while simultaneously feeding the guide posts 548 through the slot 536, the operator may have a difficult time holding the engagement teeth in the guide slot.

Example embodiments may eliminate the complication involved in performing these alignments simultaneously by removing the need for the operator to hold the chain 520 to the bar 530. In this regard, an example embodiment may provide for a bar and chain cassette 560 in which the chain 520 is already assembled to the bar 530 and to the drive sprocket 552 so the bar and chain cassette 560 can simply be attached in its fully assembled form to the main body portion of the chainsaw 510 (e.g., via the guide posts 548 engaging the slot 536).

As shown in FIG. 7, the bar and chain cassette 560 includes the bar 530, the chain 520 and the slot 536, which is provided at the chainsaw body engagement portion. The bar and chain cassette 560 is also designed so that the heel of the bar 530 contains the drive sprocket 552. As such, the drive sprocket 552 is provided between the first and second plates 534 and 535, which form the bar 530 along with the core 532. Of note, although the bar 530 of FIG. 8 is shown to include a nose wheel 570, it should be appreciated that the nose wheel 570 is not necessarily included in other example embodiments.

In some cases, the first and/or second plates 534 and 535 may also be provided with an indicator window 600 at the exposed portion of the bar 530, so that the indicator window 600 is visible when the bar and chain cassette 560 is attached to the chainsaw 510. The indicator window 600 may be operably coupled to an indicator system 610 provided in the core 532 to indicate when it is time to replace the unit.

In an example embodiment, the indicator system 610 may be operably coupled to a chain tensioning system to indicate chain tension via the indicator window 600. Thus, for example, the indicator system may include a spring assembly 620 configured to push on a plate 630 that protrudes into the slot 536. As the plate is repositioned during chain tensioning, the spring assembly 620 may be impacted to adjust the indication shown in the indicator window 600. Thus, the operator can adjust tension and watch for the proper tension to be achieved. Once the proper tension is achieved, as indicated in the indicator window 600, the bar 530 may be tightened onto the chainsaw 510. In other embodiments, the tensioning may be manually accomplished with the cover 542 as described above.

Figure 9:
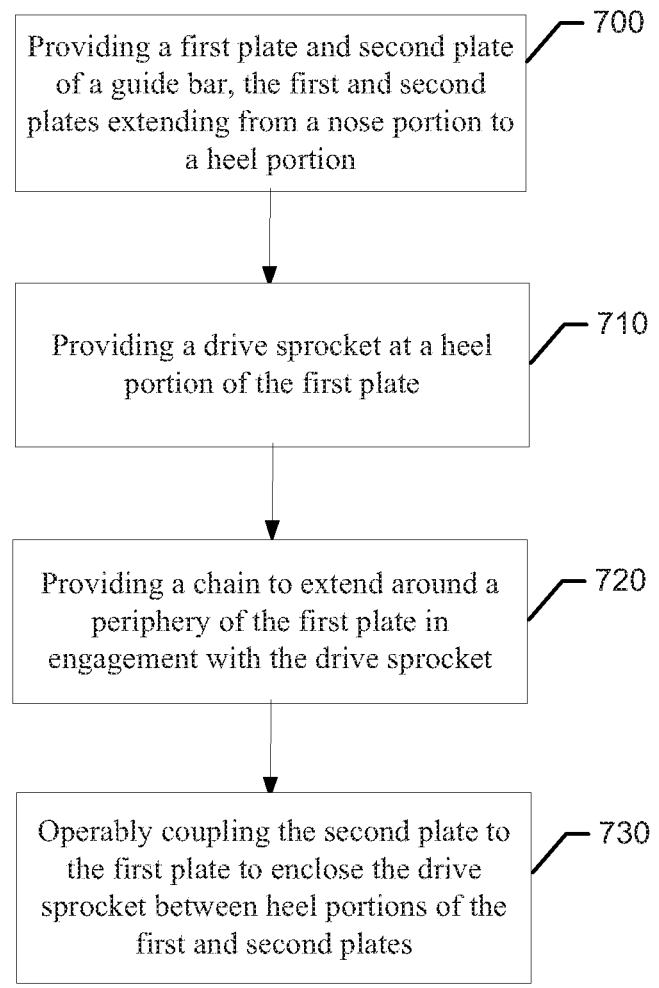
FIG. 9 illustrates a method of providing a bar and chain cassette in accordance with an example embodiment.

FIGS. 5-8 may be useful in understanding how the bar and chain cassette 560 may be structured, and how the bar and chain cassette 560 may be arranged in connection with installation of the bar and chain cassette 560 onto the chainsaw 510. However, example embodiments may also extend to the method of producing the bar 530, chain 520 and drive sprocket 552 in one assembled unit. FIG. 9 illustrates a method of producing the bar and chain cassette 560 according to an example embodiment.

As shown in FIG. 9, the method may include providing a first plate and second plate of a guide bar at operation 700. The first and second plates may extend from a nose portion to a heel portion. The method may further include providing a drive sprocket at a heel portion of the first plate at operation 710. A chain may then be provided to extend around a periphery of the first plate in engagement with the drive sprocket at operation 720. The second plate may then be operably coupled to the first plate to enclose the drive sprocket between heel portions of the first and second plates at operation 730.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A chainsaw comprising: a power unit disposed in a housing; and a working assembly powered responsive to operation of the power unit, the working assembly comprising a guide bar around which a chain is rotatable, wherein the guide bar comprises: a first side plate and a second side plate facing each other and extending away from the housing to a nose of the guide bar; a core disposed between the first side plate and the second side plate; a tensioning plate provided in the core; and a tension indicator provided at the core and operably coupled to the tensioning plate, the tension indicator comprising a gauge and a needle disposed on the guide bar; wherein the tensioning plate is configured to move toward the tension indicator in response to tension of the chain increasing thereby causing the needle to move to visibly indicate the tension of the chain on the gauge relative to a desirable tension range indicated on the gauge.

2. The chainsaw of claim 1, further comprising a clamping assembly to clamp the guide bar to the housing and a tensioning assembly to adjust the tension of the chain, wherein the tensioning assembly interfaces with the needle to indicate the tension of the chain at the gauge on the guide bar.

3. The chainsaw of claim 1, wherein the core defines a void space configured to receive the tension plate.

4. The chainsaw of claim 1, wherein the tension plate interfaces with the needle responsive to adjustment of the tension of the chain, and wherein the needle is formed from the core and is deflected based on movement of the tension plate relative to the gauge on the guide bar.

5. The chainsaw of claim 4, wherein the gauge indicates a predetermined range of the tension of the chain.

6. A guide bar for guiding a chain of a chainsaw, the guide bar comprising: a first side plate and a second side plate facing each other and extending away from a housing of the chainsaw to a nose of the guide bar; a core disposed between the first side plate and the second side plate; a tensioning plate provided in the core; and an indicator assembly provided at the core; wherein the indicator assembly comprises a tension indicator, a spring assembly, and a gauge, the tension indicator comprising a needle; wherein the tensioning plate is configured to act on the spring assembly in response to tension of the chain increasing, wherein in response to the tensioning plate acting on the spring assembly, the spring assembly is configured to act on the neede to move to visibly indicate the tension of the chain on the gauge relative to a desirable tension range indicated on the gauge.

7. The guide bar of claim 6, further comprising a clamping assembly to clamp the guide bar to the housing and a tensioning assembly to adjust the tension of the chain, wherein the tensioning assembly interfaces with the needle to indicate the tension of the chain at the gauge on the guide bar.

8. The guide bar of claim 6, wherein the core defines a void space configured to receive the tension plate.

9. The guide bar of claim 6, wherein the tension plate interfaces with the needle responsive to adjustment of the tension of the chain, and wherein the indicator is formed from the core and is deflected based on movement of the tension plate relative to the gauge on the guide bar.

10. The guide bar of claim 9, wherein the gauge indicates a predetermined range of tension of the chain.

11. A guide bar for guiding a chain of a chainsaw, the guide bar comprising: a first side plate and a second side plate facing each other and extending away from a housing of the chainsaw to a nose of the guide bar; a core disposed between the first side plate and the second side plate; and an indicator assembly provided at the core, where the indicator assembly comprises a tension indicator and a spring assembly, wherein the tension indicator comprises a gauge and a needle, and wherein the spring assembly is configured to act on the needle to move to visibly indicate a tension of the chain on the gauge relative to a desirable tension range indicated on the gauge.

12. The guide bar of claim 11, further comprising a clamping assembly to clamp the guide bar to the housing and a tensioning assembly to adjust the tension of the chain, wherein the tensioning assembly interfaces with the needle to indicate the tension of the chain at the gauge on the guide bar.

13. The guide bar of claim 11, wherein the core defines a void space configured to receive a tension plate, wherein the tension plate interfaces with the needle responsive to adjustment of the tension of the chain, and wherein the needle is formed from the core and is deflected based on movement of the tension plate relative to the gauge on the guide bar.

14. The guide bar of claim 13, wherein the gauge indicates a predetermined range of the tension of the chain.

15. The chainsaw of claim 1, wherein the first side plate or the second side plate comprises an indicator window, the gauge being disposed in the indicator window showing the tension of the chain indicated by the needle.

16. The chain saw of claim 15, wherein the guide bar comprises a guide bar tension adjustment slot that forms as an opening in the guide bar and configured to provide for variable engagement positions for the guide bar within the chainsaw; and
wherein the indicator window is disposed at a position separated from the guide bar tension adjustment slot.

17. The chainsaw of claim 1, wherein the tension plate is configured to move along a longitudinal center line of the guide bar to apply a force on the needle to move the needle in a direction having a component transverse to the longitudinal center line of the guide bar.

18. The chainsaw of claim 1, wherein the needle is formed of a bent portion of the core.

19. The chainsaw of claim 1, wherein the guide bar comprises a guide bar tension adjustment slot extending along a longitudinal center line of the guide bar; and
wherein the tensioning plate does not extend into the guide bar tension adjustment slot.

20. The chainsaw of claim 1, wherein the tension plate is configured to move along a longitudinal center line of the guide bar to apply a force on the needle to pivot the needle relative to the longitudinal center line of the guide bar.

* * * * *